United States Patent [19]

Dörr et al.

[11] Patent Number: 4,748,082

[45] Date of Patent: May 31, 1988

[54] ZEOLITE CASTINGS

[75] Inventors: Jürgen Dörr, Kriftel; Peter Kleinschmit, Hanau; Reinhard Klingel, Alzenau; Reinhard Manner, Maintal, all of Fed. Rep. of Germany

[73] Assignee: Degussa AG, Frankfurt am Main, Fed. Rep. of Germany

[21] Appl. No.: 741

[22] Filed: Jan. 6, 1987

[51] Int. Cl.$^4$ .................... F28F 1/00; B01J 29/04; B32B 5/16; B32B 13/00

[52] U.S. Cl. .................... 428/331; 428/703; 165/905; 502/60; 502/63; 423/328

[58] Field of Search .................... 165/905; 502/60, 63; 423/328; 428/329, 330, 331, 702, 703

[56] References Cited

U.S. PATENT DOCUMENTS

| | | | |
|---|---|---|---|
| 3,014,872 | 12/1961 | Scott | 165/905 X |
| 3,968,786 | 7/1976 | Spielberg | 165/905 X |
| 4,234,380 | 11/1980 | Kihlstedt et al. | 423/328 X |
| 4,256,178 | 3/1981 | Fauvel | 165/905 X |
| 4,257,481 | 3/1981 | Dobson | 165/905 X |
| 4,268,574 | 5/1981 | Peccenini et al. | 423/328 X |
| 4,324,838 | 4/1982 | Ballard et al. | 423/328 X |
| 4,479,368 | 10/1984 | Gloeckler | 66/75.2 |
| 4,674,563 | 6/1987 | Maier-Laxhuber et al. | 165/104.12 |

FOREIGN PATENT DOCUMENTS

| | | |
|---|---|---|
| 140380 | 5/1985 | European Pat. Off. |
| 3207656 | 8/1983 | Fed. Rep. of Germany |
| 3312875 | 11/1984 | Fed. Rep. of Germany |
| 8200816 | 3/1982 | PCT Int'l Appl. ............ 423/328 |

*Primary Examiner*—George F. Lesmes
*Assistant Examiner*—D. R. Zirker
*Attorney, Agent, or Firm*—Cushman, Darby & Cushman

[57] ABSTRACT

There are prepared zeolite molded articles which also contain alkali silicate and/or alkaline earth silicate and mineral fibers and/or carbon fibers in addition to the zeolite.

6 Claims, No Drawings

ZEOLITE CASTINGS

BACKGROUND OF THE INVENTION

The invention is directed to zeolite molded articles, e.g., castings, a method of producing them and their use in heat accumulators.

It is known that zeolites can be used in heat accumulators (German-OS No. 33 12 875).

It is also known that zeolite molded blanks can be used in heat accumulators which are adapted to the heat exchanger surfaces and contain flow conduits (German-OS No. 32 07 656).

The use of molded zeolite blanks containing a fine-meshed metal fabric in heat exchangers is also known (German-OS No. 33 47 700).

Furthermore, drying elements of zeolite are known which are provided with a gas-permeable casing of glass, ceramics, porcelain, plastics or metal (European-OS No. 140 380).

The known molded articles have substantial disadvantages due to the metal fabrics. Thus, the metal fabric is difficult to work into the zeolite mass. It is not possible to homogenize with the zeolite binder mixture in known mixing devices. Metal fabrics are expensive to manufacture. They are relatively heavy and result in the formation of tears and breaks in the zeolite molded article on account and breaks in the zeolite molded article on account of the different coefficients of expansion.

The metal fabric has the further disadvantage that it corrodes upon contact with the water.

There was thus the task of producing zeolite molded articles for use in heat accumulators or sorption devices which are formed in accordance with the dimensions of the heat accumulator device and which are sufficiently strong and exhibit a uniform coefficient of expansion.

SUMMARY OF THE INVENTION

The invention is directed to zeolite molded articles which contain alkali silicate, e.g., sodium silicate or potassium silicate and/or alkaline earth silicate, e.g. calcium silicate or magnesium silicate mineral fibers and/or carbon fibers in addition to zeolite.

The zeolite molded articles contain, per 100 parts by weight of zeolite, 7–29.5 parts by weight of silicate and 0.2 to 28 parts by weight of fibrous filler. Preferably, the zeolite molded articles contain, per 100 parts by weight of zeolite, 18–29 parts by weight of silicate and 0.2 to 9.5 parts by weight of fibrous filler.

The zeolite molded articles, e.g., castings of the invention can have a platelike geometry, preferably that of flat bodies with square or round boundaries with edge lengths or equivalent diameters of 1 mm to 500 mm, preferably of 10 mm to 500 mm and a thickness of 1 mm to 30 mm, preferably of 4 mm to 25 mm.

The zeolite moldings can have a surface which corresponds to the intended use, such as, for example, a structured surface. The surface structures can be indentations such as, for example, waffle patterns and profiled flow conduits of any geometry, such as is customary in plate heat exchanger plates, as well as hollow space structures such as honeycomb bodies or block heat exchangers. They can be produced, for example, by positioning perforations or conduits in a triangular or rectangular distribution with perforation or equivalent conduit diameters of 0.2 to 1.2 times the thickness of the zeolite moldings, preferably 0.8 to 1.1 and with a perforation or conduit distribution of 1.2 to 2.5 times the perforation or equivalent conduit diameter, preferably 1.4 to 2.0.

The shaping of the zeolite molding, e.g. casting can be carried out by means of a suitable pressing apparatus. The surface structure can be obtained both by the pressing as well as by mechanical working.

The shaping can occur by means of an isostatic or uniaxial pressing in the range of 0.1 MPa to 50 MPa, preferably in the range of 0.1 to 30 MPa as a function of the shape and the size of the zeolite casting. The amount of pressure applied can be held constant for a time of 0 seconds to 20 minutes, preferably less than 10 minutes.

The invention is also directed to a method of producing the zeolite molded articles which comprises mixing powdery zeolite with alkali silicate and/or alkaline earth silicate, such as, for example, sodium silicate, and water; mineral fibers and/or carbon fibers are mixed in, the mixture obtained is pressed and gradually dried with rising temperatures until a constant weight and activated.

The zeolites used can be zeolites of the A, X or Y type, optionally in their form replaced with $Na^{\oplus}$, $Mg^{\oplus\oplus}$ or $Ca^{\oplus\oplus}$ ions. In a preferred embodiment of the invention there can be used zeolite A replaced with $Mg^{\oplus\oplus}$ ions.

The mineral fiber used can be triton kaowool, for example.

The alkali silicate or alkaline earth silicate, especially sodium silicate, which is added as binder can have a module of 2.0 to 3.7, preferably 3.0 to 3.7.

The amount of mineral fibers or carbon fibers in the mixture can amount to 0.1 to 15 percent by weight, preferably 0.5 to 5 percent by weight in relation to the zeolite/water/alkali silicate or alkaline-earth silicate.

The mixture water glass (as g $SiO_2$ + g $Na_2O$): zeolite (bone-dry):water:fiber can assume any value within a range of (7–29.5):100:(12–73):(0.2–28). The mixture preferably has the composition (18–29):100:(60–70):(0.2–9.5).

The zeolite molded article can be substituted before the drying, before the activation and/or after the activation with the specified cations. Insoluble alkaline-earth silicate can be formed from alkali silicate at the substitution of the zeolite tiles with alkaline-earth ions.

The zeolite molded article can be dried first at temperatures of 20°–39° C., whereby the $CO_2$ content of the drying air is set to less than 200 ppm, subsequently optionally in a second drying state at temperatures of 40°–120° and optionally in a third drying state at 121°–200° C. under conditions which are otherwise identical.

The dried zeolite molded article is activated at temperatures of 650° at the most.

These zeolite molded articles of the invention are advantageously easy to produce. They are inexpensive and corrosion-proof. Since the mineral fibers as well as the zeolite consists primarily of $SiO_2$ and $Al_2O_3$, the coefficient of expansion is of a comparable magnitude. Therefore, thermally induced fissures and breaks can not occur in the zeolite tiles of the invention.

The zeolite molded articles of the invention can be used with preference for the adsorption of water molecules. Depending on the initial zeolite used, the zeolite molded articles of the invention can also adsorb larger molecules.

It is also advantageous that the zeolite castings of the invention after they are completed are able to be worked with customary tools (e.g. saws, boring machines). Thus, special flow conduits can be worked into the heat exchanger during installation prior to delivery to the site. This is not possible when metal mesh is used, since tears or frayed areas can develop at the cut or drilled edges.

The composition can comprise, consist essentially of or consist of the stated materials and the process can comprise, consist essentially or consist of the recited steps with such materials.

Unless otherwise indicated all parts and percentages are by weight.

DETAILED DESCRIPTION

EXAMPLE 1

8.5 kg zeolite Na-A (water content 19.5 percent by weight) are mixed with 3.2 liters waterglass (sodium silicate) (module 3.7:$\rho=1.25$ kg/m$^3$) and 0.24 liters H$_2$O for approximately 30 min. Then, 382 g (3%) mineral fibers are mixed in. Castings are produced from the mixture according to the following conditions.
  a. Size of the briquettes: 150×150 mm
  b. Thickness: 4 mm
  c. Pressing time: 10 min.
Variation: Amount of pressure applied
  d. First drying: 20° C.
     Second drying: 50° C.
     Third drying: 110° C. until a constant weight each time
  e. Activation: 450° C.

| Pressure (MPa) | Water absorption (equilibrium load 80% rel. humidity) |
|---|---|
| 0.1 | 15.8 |
| 10.3 | 15.0 |
| 17.2 | 15.7 |
| 25.7 | 18.9 |
| 40.0 | 12.7 |

EXAMPLE 2

Mixtures are prepared according to Example 1 with the difference that instead of Na-A zeolite, ion-replaced zeolites of the MgA, CaA, MgX, MgY types are used. In order to produce the ion-replaced zeolites of the MgA type, 10 kg zeolite Na-A are suspended in 19.5% Mg (NO$_3$)$_2$ solution for 2 hours at 40° C., filtered and washed free of NO$_3$. The filter cake is dried at 105° C. in a drying cabinet and subsequently ground.

An aqueous Ca(NO$_3$)$_2$ solution is used in an analogous manner to produce the zeolite Ca-A.

Zeolites of the MgX and MgY types are produced by working according to the directions given above and using 10 kg NaX zeolite (20 percent by weight H$_2$O) or 10 kg NaY zeolite (21 percent by weight H$_2$O) instead of 10 kg NaA zeolite. The processing is carried out according to Example 1.
  Amount of pressure applied: 25 MPa
  Activation: 650° C.

| Type | Water absorption (equilibrium load 80% rel. humidity) |
|---|---|
| MgA | 19.6 |
| CaA | 19.2 |
| MgX | 17.4 |
| MgY | 16.8 |
| NaA | 18.9 |

EXAMPLE 3

6.8 kg zeolite Na-A (bone dry) are mixed with 1.0 liter waterglass (sodium silicate) (module 3.7,$\rho=1.25$) and homogenized; then, 480 g mineral fibers are worked in.
  Variation: Size of the briquettes 1×1 mm to 500×500 mm
  Pressure: 8MPa
  Thickness: 5.2 mm
  Pressing time: 20 min.
  First drying: 39° C.
  Second drying: 120° C. to constant weight
  Activation: 500° C.

| Edge Length | Water absorption (equilibrium load 80% rel. humidity) |
|---|---|
| 1 mm | 18.7 |
| 10 mm | 18.9 |
| 100 mm | 19.8 |
| 250 mm | 18.9 |
| 500 mm | 19.0 |

EXAMPLE 4

6.8 kg zeolite NaA (bone dry) are mixed with 4.0 liters waterglass (sodium silicate) (module 2.0$\rho=1.25$ kg/m$^3$) and homogenized; then, 13 g mineral fibers are worked in.
  Shape: 100 mm diameter
  Pressing time: 5 min.
  Pressure: 17 MPa
  Variation: Thickness of the briquettes
  First drying: 20° C.
  Second drying: 85° C.
  Third drying: 125° C.
  Activation: 480° C.

| Thickness | Water absorption (equilibrium load 80% rel. humidity) |
|---|---|
| 1 mm | 15.7 |
| 4 mm | 15.5 |
| 10 mm | 12.2 |
| 25 mm | 11.5 |
| 30 mm | 10.8 |

EXAMPLE 5

8.5 kg zeolite (20% H$_2$O) are mixed with 4 liters waterglass (sodium silicate) (module 2.0.$\rho=1.25$ kg/m$^3$ and homogized. Then, 1900 g mineral fibers are worked in.
  Shape: 5 mm diameter
  Pressure: 8 MPa
  Thickness: 4 mm
  Variation: Pressing time

| Time | Water absorption (equilibrium load 80% rel. humidity) |
|---|---|
| 0.1 sec. | 14.9 |

-continued

| Time | Water absorption (equilibrium load 80% rel. humidity) |
|---|---|
| 1 min. | 15.2 |
| 5 min. | 15.2 |
| 10 min | 16.0 |
| 20 min | 14.0 |

EXAMPLE 6

8.5 kg zeolite MgX (20% $H_2O$) are homogeneously mixed with 1 liter waterglass (sodium silicate) (module 2.0$\rho$=1.25 kg/m$^3$) and 1.5 liter $H_2O$. Then, 700 g mineral fibers are worked in. The molded articles are produced in accordance with Example 1 and activated.

The activated molded articles are provided with bores having a diameter of 1.4 mm to 2.0 mm.

| Water absorption (equilibrium load 80% rel. humidity | bores |
|---|---|
| 16.5% | 1.4 mm |
| 16.2% | 1.7 mm |
| 16.8% | 2.0 mm |

EXAMPLE 7

8.5 kg zeolite NaA (20% $H_2O$) are homogenized with 1 liter waterglass (sodium silicate) (module 3.7, $\rho$=1.25 and 1.5 liters water. Then, 17 g mineral fibers are worked in.

The molded articles are pressed in accordance with example 1 at pressures of 25.7 MPa and subsequently after treated according to Example 1. Conduits 2 mm deep and 5 mm wide are milled in at intervals of 10 mm. The water absorption (80% rel. humidity to equilibrium load) is 19.5 percent by weight.

EXAMPLE 8

A mixture is produced in accordance with Example 1. The pressed zeolite blanks are divided into 3 groups:

Group A is treated before the drying with aqueous $CaCl_2$ solution (1 liter 2 moles $CaCl_2$ per zeolite molded article; 1 hour room temperature).

Group B is treated aftrer the drying in accordance with Example 4 with aqueous $CaCl_2$ solution (1 liter 2 moles $CaCl_2$ per zeolite molded article, 1 hour 60° C.).

Group C is treated after activation in accordance with Example 2 with aqueous $CaCl_2$ solution) 1 liter $CaCl_2$ per zeolite molded article, 2.0 hours 80° C.).

Then, all zeolite blanks are dried in accordance with Example 5 and activated.

| Group | Degree of enhancement mole % | Water Absorption (equilibrium load 80% rel. humidity) |
|---|---|---|
| A | 22.5 | 17.9 |
| B | 19.5 | 16.5 |
| C | 18.5 | 16.8 |

What is claimed is:

1. A zeolite molded article comprising (1) per 100 parts by weight of zeolite, (2) 7-29.5 parts by weight of at least one silicate selected from the group consisting of sodium silicate, potassium silicate, calcium silicate and magnesium silicate and (3) 0.2 to 28 parts by weight of at least one fibrous filler of the group consisting of mineral fibers and carbon fibers.

2. A zeolite molded article according to claim 1 made from a mixture containing (1) zeolite (2) silicate, (3) fibrous filler an (4) water containing 0.1 to 15% by weight of fibrous filler.

3. A zeolite molded article according to claim 2 containing the silicate (2) in an amount sufficient to bind the zeolite (1) and the fibrous filler (3).

4. A zeolite molded article according to claim 1 containing 18-29 parts by weight (2) silicate and 0.2 to 9.5 parts by weight of (3) fibrous filler.

5. A zeolite molded article according to claim 1 wherein the silicate (2) is sodium silicate.

6. A zeolite molded article according to claim 1 wherein the silicate (2) is sodium silicate.

* * * * *